United States Patent
Weckerle et al.

(10) Patent No.: US 9,603,096 B2
(45) Date of Patent: Mar. 21, 2017

(54) DISTRIBUTION SYSTEM AND METHOD FOR MANAGING POWER CONSUMPTION OF SUCH A DISTRIBUTION SYSTEM

(71) Applicant: Kathrein-Werke KG, Rosenheim (DE)

(72) Inventors: Martin Weckerle, Ulm (DE); Frank Oehler, Ulm (DE); Johannes Schlee, Ulm (DE)

(73) Assignee: KATHREIN-WERKER KG, Rosenheim (DE)

( * ) Notice: Subject to any disclaimer, the term of this patent is extended or adjusted under 35 U.S.C. 154(b) by 0 days.

(21) Appl. No.: 14/823,049

(22) Filed: Aug. 11, 2015

(65) Prior Publication Data
US 2016/0050630 A1 Feb. 18, 2016

(30) Foreign Application Priority Data

Aug. 12, 2014 (GB) .................................. 1414280.6
Aug. 12, 2014 (GB) .................................. 1414288.9

(51) Int. Cl.
*G08C 17/00* (2006.01)
*H04W 52/02* (2009.01)
*H04W 16/14* (2009.01)

(52) U.S. Cl.
CPC ....... *H04W 52/0274* (2013.01); *H04W 16/14* (2013.01)

(58) Field of Classification Search
None
See application file for complete search history.

(56) References Cited

U.S. PATENT DOCUMENTS

| | | | |
|---|---|---|---|
| 7,761,093 B2 | 7/2010 | Sabat, Jr. et al. | |
| 8,428,510 B2 | 4/2013 | Stratford et al. | |
| 8,830,882 B2 | 9/2014 | Kummetz et al. | |
| 2008/0219214 A1 | 9/2008 | Chen et al. | |
| 2011/0237182 A1* | 9/2011 | Stratford | H04W 52/52 455/7 |

(Continued)

FOREIGN PATENT DOCUMENTS

| | | |
|---|---|---|
| CN | 102843753 | 12/2012 |
| EP | 2566258 | 3/2013 |

(Continued)

OTHER PUBLICATIONS

Official Action issued in GB 1414280.6 on Dec. 4, 2014.
Official Action issued in GB 1414288.9 on Dec. 5, 2014.

*Primary Examiner* — Edan Orgad
*Assistant Examiner* — Rebecca Song
(74) *Attorney, Agent, or Firm* — Stephen H. Eland; Dann, Dorfman, Herrell & Skillman

(57) ABSTRACT

A distribution system (10) for relaying telecommunication signals (6) is disclosed. The distribution system (10) comprises a central hub (20) connectable to one or more base stations (5), a plurality of remote units (80-1, . . . , 80-8) for relaying a telecommunication signals (66) supplied by the central hub (20), whereby the remote units (80-1, . . . , 80-8) are provided with a plurality of uplinks (60-1, . . . , 60-8) and a plurality of downlinks (50-1, . . . , 50-8), and a detector (30, 32) for detecting an activity on the uplink. The distribution system (10) is adapted to independently switch at least one of the plurality of downlinks (50-1, . . . , 50-8), while the plurality of uplinks (60-1, . . . , 60-8) remains active.

13 Claims, 3 Drawing Sheets

(56) References Cited

U.S. PATENT DOCUMENTS

| | | | |
|---|---|---|---|
| 2012/0099490 A1 | 4/2012 | Kummetz et al. | |
| 2012/0258657 A1* | 10/2012 | Scheinert | H04B 7/0874 455/3.05 |
| 2013/0017863 A1* | 1/2013 | Kummetz | H04W 16/04 455/562.1 |
| 2013/0107763 A1* | 5/2013 | Uyehara | H04B 7/024 370/278 |
| 2015/0304044 A1* | 10/2015 | Stapleton | H04B 10/25753 398/115 |

FOREIGN PATENT DOCUMENTS

| | | |
|---|---|---|
| EP | 2466972 | 9/2013 |
| GB | 1414280 | 11/1975 |
| GB | 1414288 | 11/1975 |
| WO | 2009011640 | 1/2009 |
| WO | 2011151684 | 12/2011 |
| WO | 2012004663 | 1/2012 |
| WO | 2013063025 | 5/2013 |
| WO | 2013070614 | 5/2013 |
| WO | 2014026005 | 2/2014 |
| WO | 2014128692 | 8/2014 |
| WO | 2015064693 | 5/2015 |

* cited by examiner

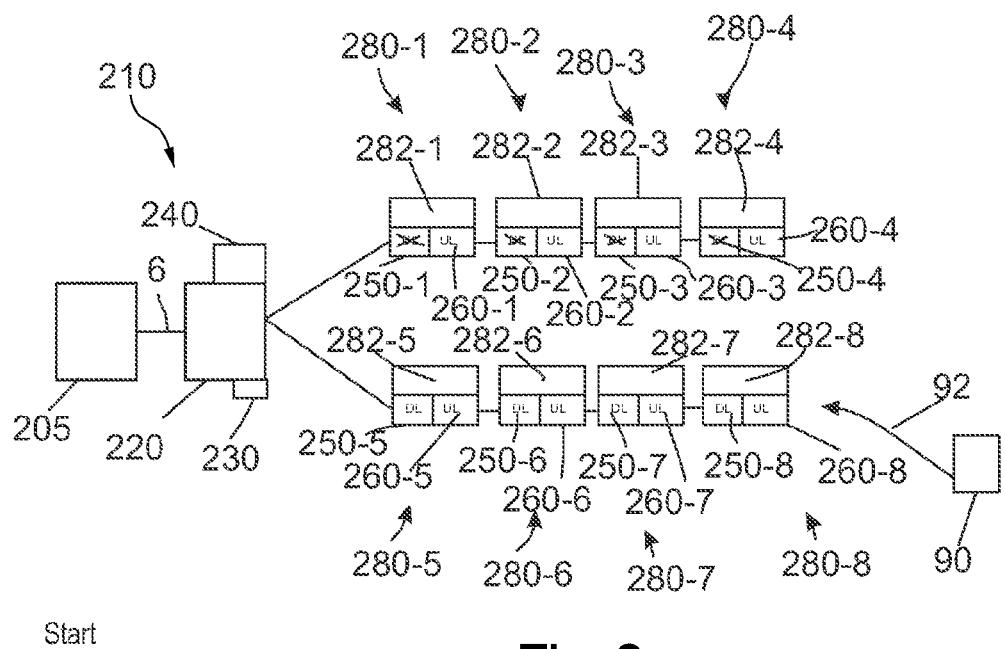
Fig. 3
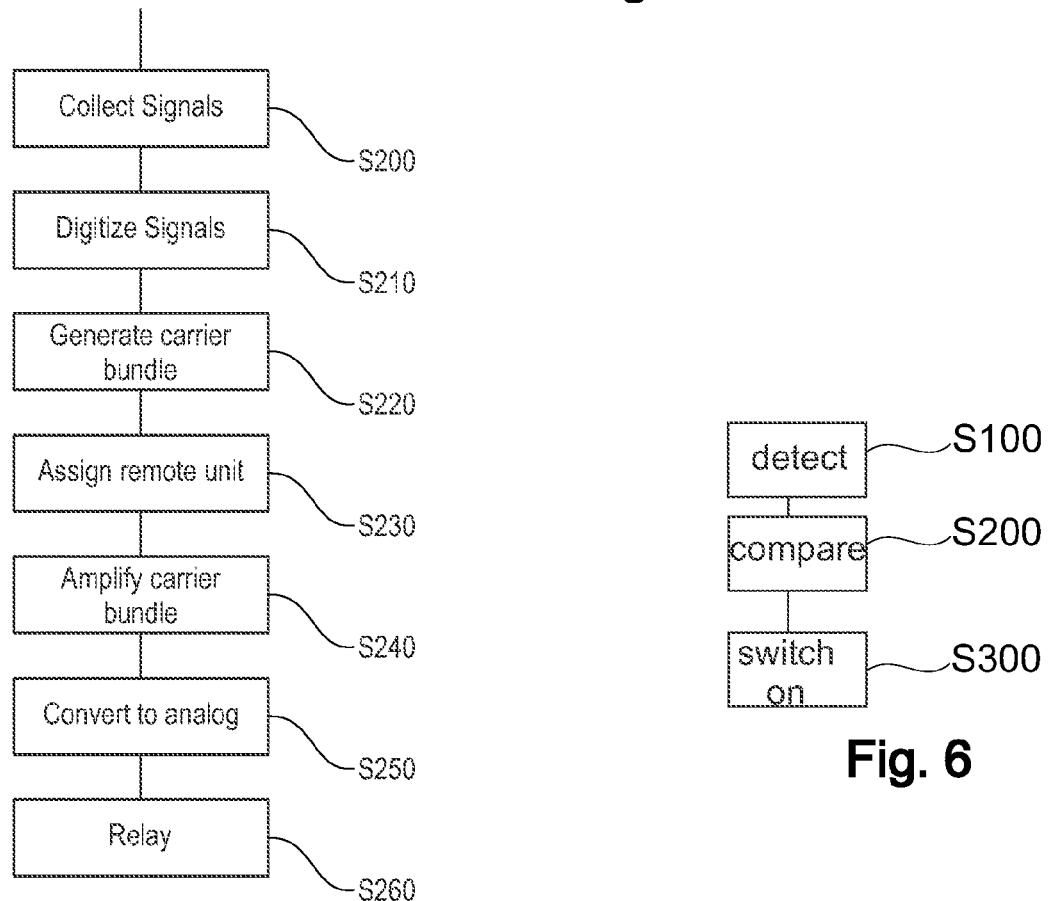
Fig. 5
Fig. 6

DISTRIBUTION SYSTEM AND METHOD FOR MANAGING POWER CONSUMPTION OF SUCH A DISTRIBUTION SYSTEM

CROSS REFERENCE TO RELATED APPLICATIONS

This application is related to co-pending International Patent Application No PCT/EP2015/064693 entitled "Method and System for Relaying Telecommunications Signals with Efficient Joint Capacity" filed on 1 Jul. 2015 and to International Patent Application No. PCT/EP2015/068578, filed on 12 Aug. 2015 and entitled "Method and System for Relaying Telecommunications Signals". This application further claims benefit of and priority to UK Patent Application No. 1414288.9 filed on 12 Aug. 2014 and entitled "Distribution System and Method for Managing Power Consumption of Such a Distribution System" as well as UK Patent Application No. 1414280.6 filed on 12 Aug. 2014 and entitled "Method and System for Relaying Telecommunications Signals".

SUMMARY OF THE INVENTION

The present invention relates to distribution system for relaying telecommunication signals and a method for managing power consumption of such a distribution system.

BACKGROUND OF THE INVENTION

The use of mobile communications networks has increased substantially over the two decades. Operators of the mobile communications networks have increased the number of base stations in order to meet an increased demand for service by users of the mobile communications networks. The operators of the mobile communications network need to reduce the running costs of the base station as well as improve the coverage of the base station. One option to do this is to implement systems for relaying the telecommunications signals of the mobile communication network as a distributed antenna system (DAS).

The communications standards typically provide a plurality of channels or frequency bands useable for an uplink communication from a mobile station, such as a handset, to a radio station as well as for a downlink communication from the radio station to the mobile station.

For example, the communication standard "Global System for Mobile Communications (GSM)" for mobile communications specifies different radio frequencies for use in different regions. In North America, GSM operates on the primary mobile communication bands 850 MHz and 1900 MHz. In Europe, Middle East and Asia most of the providers use the primary mobile communication bands 900 MHz and 1800 MHz. Other communications bands use other frequencies.

The constantly increasing capacity demand in wireless communications and the fact that about 80% of the traffic on the mobile distribution system is generated indoors requires new methods to provide flexible signal relaying systems to enable an efficient spectrum usage. When indoor traffic is handled with a pure outdoor macro coverage solution, the signal penetration and the signal quality is poor in the indoor environment. Indoor coverage solutions with distributed antenna systems help overcoming this issue, but the increasing capacity demand requires more advanced indoor solutions beyond pure coverage systems.

Active distributed antenna systems (DAS) or micro C-RAN have been developed to improve the coverage indoors. Theses distribution systems have the capability of dynamic traffic/cell switching of signal traffic. The radio frequency (RF) signals in the DAS are communicated between a central hub and a plurality of remote units. The central hub is connected to one or more of the base stations.

In the DAS, the coverage of a single cell is not necessarily provided by a single one of the remote units. The term "cell" is used in the present disclosure according to the definition used for GSM and is equivalent to the definition of a sector in case of UMTS and LTE standards. The cell describes a multicarrier signal provided by a base station and which is typically relayed into a sector. The plurality of the remote units relay the same telecommunication signal for the cell throughout the coverage area of the cell. In the context of this disclosure, the coverage area of the cell is defined as the sum of the individual coverage areas of the signals from each ones of the remote radio units, which are assigned to cover the cell. In case in which a plurality of antennas is connected to at least one remote radio unit, the coverage area of the cell is the sum of the individual antenna coverage areas connected to the at least one remote radio unit assigned to the cell.

The DAS may be used to provide coverage and capacity inside a building, as well as coverage and capacity in metropolitan or campus areas.

U.S. Pat. No. 7,761,093 B2 describes a method and system allowing multiple providers to share the same DAS. Each operator's base station signal is digitized and can be routed to any digital remote unit at which the signal can be digitally combined with any other signal from a different operator within the same frequency band or another frequency band supported by the remote unit. The digitally combined signals are then converted to analog RF signals in the remote unit and finally relayed into the coverage area of the remote unit.

The capacity demand in a mobile radio system is varying over time. At a same location, there are peak hours during which the highest capacity demand for signal traffic occurs and there might be times with extremely low signal traffic. The traffic demand may also very depending on the location. A mobile communications system is typically designed to cope with the expected peak hour load at each location. In other words, the mobile radio system is most of the time over-specified for the actual requirements. This results in additional power consumption.

In active DAS installations especially with low power remote units it is important to provide high linearity over the entire supported frequency band in order to support a multi-operator and multi-carrier signal transmission for any arbitrary carrier allocation within the frequency band. High linear power amplifiers are required which are typically less efficient than non-linear power amplifiers. A reduction in output power due to a reduction in or no signal traffic has a marginal influence, or even no influence, on the overall power consumption of the remote unit when using high linear power amplifiers. Power saving in such active DAS installations can be achieved by switching off one or more of the remote radio units. Switching off the remote units in their entirety can, however, result in gaps in the coverage area in the affected region at which the remote units have been switched off.

One object of the present disclosure is power savings in telecommunication distribution systems.

SUMMARY OF THE INVENTION

A distribution system for relaying telecommunication signals is disclosed. The distribution system comprises a central hub connectable to one or more base stations and a plurality of remote units for relaying a telecommunication signals supplied by the central hub. The remote units are provided with a plurality of uplinks and a plurality of downlinks. A detector for detecting an activity on the uplink is present in the distribution system. The distribution system is adapted to independently switch at least one of the plurality of downlinks, whilst the plurality of uplinks remains active. This enables power to be saved in the distribution system whilst enabling the distribution system to detect telecommunications signals from mobile stations entering a coverage area of the distribution system.

The detector is adapted to detect a signal amplitude at a defined frequency range and to make a comparison of the detected signal amplitude to a pre-defined threshold value and switches on one or more of the downlinks when the pre-defined threshold value is reached.

The detector can be either located within the central hub or within one or more of the remote units. The central hub is connectable to the base station. The central hub can be directly connected to the plurality of remote units. Alternatively, the central hub can be connected to at least one expansion hub connectable to the plurality of remote units. In this embodiment, the detector can be located in one of said at least one expansion hub, the central hub, or within one or more of the remote units.

A method for managing power consumption of a distribution system is also disclosed. The method comprises switching off the downlinks, detecting an uplink activity signal corresponding to an uplink activity in at least one of the remote units, switching on one or more of the downlinks on detection of the uplink activity signal.

These and other aspects of the invention will be apparent from and elucidated with reference to the embodiment(s) described hereinafter.

BRIEF DESCRIPTION OF THE FIGURES

FIG. 3 shows an overview of a system according to yet another aspect of the present invention;

FIG. 5 shows a block diagram of a method of for relaying telecommunication system with the system of FIG. 4.

FIG. 6 shows a block diagram of a method for managing power consumption of a distribution system according to an aspect of the invention.

DETAILED DESCRIPTION OF THE INVENTION

The invention will now be described on the basis of the drawings illustrating preferred embodiments. It will be understood that the embodiments and aspects of the invention described herein are only examples and do not limit the protective scope of the claims in any way. The invention is defined by the claims and their references. It will be understood that features of one aspect or embodiment of the invention can be combined with a feature of a different aspects or aspects and/or embodiments of the invention.

Figure 1:
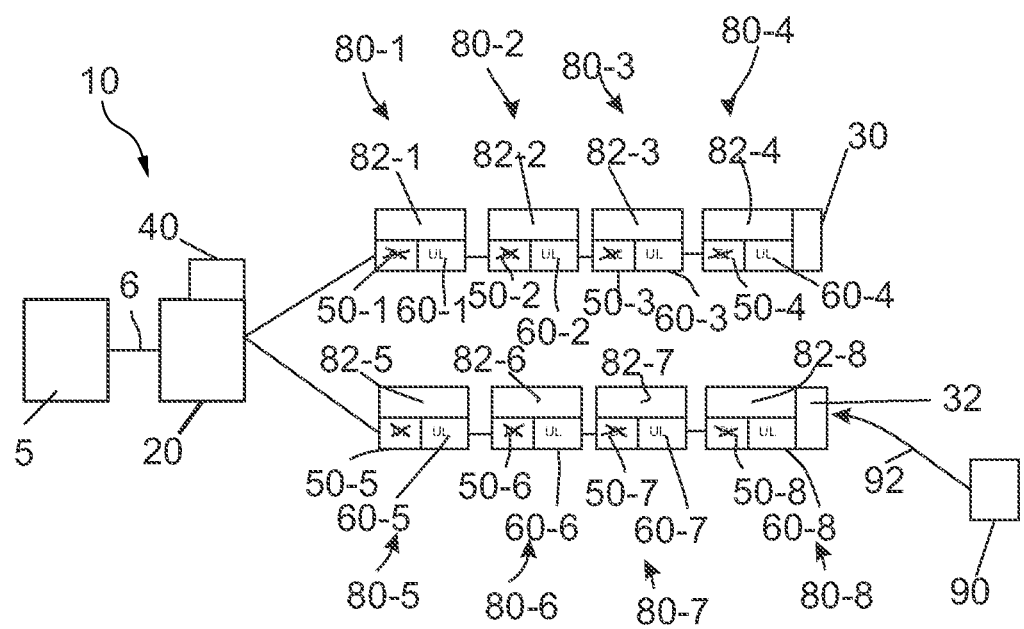
FIG. 1 shows an overview of a system according to an embodiment of the present invention.
Figure 2:
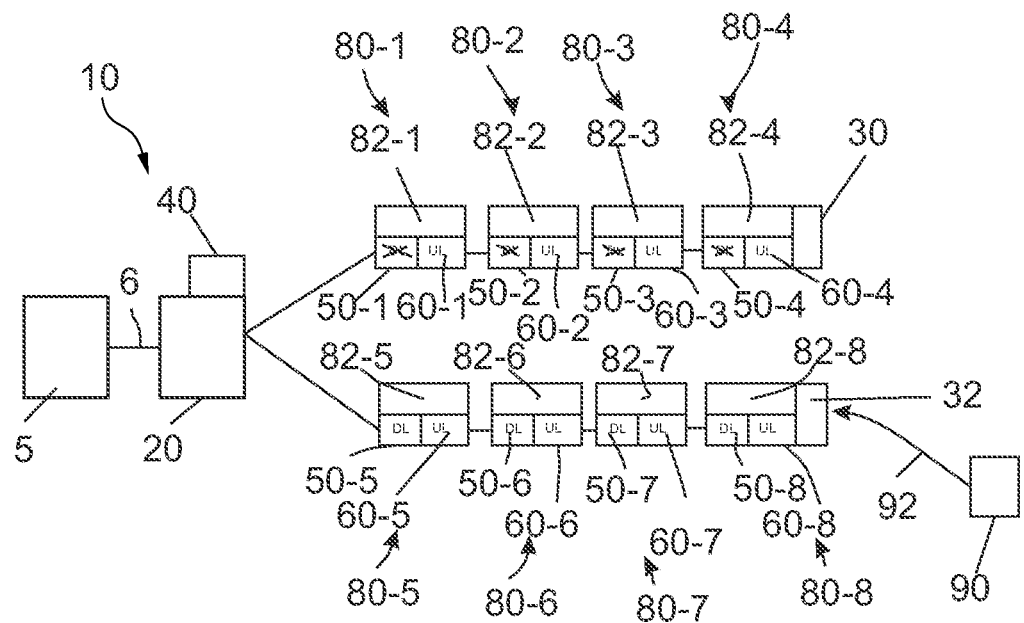
FIG. 2 shows the system of FIG. 1 in another configuration according to an embodiment of the present invention.

FIGS. 1 and 2 show an overview of a distribution system 10 for routing a plurality of telecommunication signals from at least one base station 5 to a plurality of remote units 80-1, . . . , 80-8, according to an aspect of the disclosure. FIG. 1 shows a low capacity configuration of the distribution system 10, and FIG. 2 shows a higher capacity configuration of the distribution system 10.

The distribution system 10 comprises an aggregation system or a central hub 20, connected to the base station 5 and a distribution system 40 connected to the remote units 80-1, . . . , 80-8.

In the example of FIGS. 1 and 2, there are eight remote units 80-1, . . . , 80-8, but this is a non-limiting example.

The configuration and location of the remote units 80-1, . . . , 80-8 may correspond to a an installation in a building having a ground floor and a first floor. The four upper (on the figure) remote units 80-1 to 80-4 may correspond to a first group of remote units for serving a corridor on the first floor, whilst the four lower remote units 80-5 to 80-8 (on the figure) correspond to a second group of remote units for the ground floor. The upper outer remote unit 80-4 and the lower outer remote unit 80-8 (located on the right in the figures) may be located at the entrance of the respective corridors in the first floor or the ground floor, or at the entrance of the building. The daisy chain configuration of the remote units in this embodiment is not limiting the invention. A tree structure for connecting the remote units is also possible.

The base station 5 is adapted for processing signal traffic comprising telecommunication signals to and from one or more network operators. The base station 5 passes input signals 6 to the central hub 20 for routing to one or more remote units 80-1 to 80-8.

The central hub 20 may be either digitally connected with the baseband or the radio access network, or may have a radio frequency (RF) connection with the base station 5. In the example of FIGS. 1 and 2, the central hub 20 is directly connected to the plurality of remote units 80-1, . . . , 80-8. This is not limiting the invention. In another embodiment, the central hub 20 may be connected to at least one expansion hub connectable to the plurality of remote units 80-1, . . . , 80-8. The connection between the central hub and the at least one expansion hub is preferably digital.

The central hub 20 may comprise gain units for variable independent individual gain adjustment of the input signals 6 to be passed to the remote units.

In the system 10 of FIGS. 1 and 2, each one of the remote units 80-1, . . . , 80-8 is shown with a single antenna 82-1, . . . 82-8. This is a non-limiting example of a distributed antenna system configuration. Other configurations are possible, e.g. where a plurality of antennas are connected to a single remote unit.

Each of the respective remote units 80-1, . . . , 80-8, is provided with a corresponding downlink 50-1, 50-2, . . . 50-8 and an uplink 60-1, . . . , 60-8. The downlink 50-1, 50-2, . . . , 50-8 is adapted for the transmission of telecommunication signals from the central hub 20 to a mobile device 90. The uplink 60-1, . . . , 60-8 is adapted for the transmission of telecommunication signals from the a mobile device station 90 back to the central hub 20.

In the configuration of FIG. 1, the downlinks 50-1, 50-2, . . . , 50-8 of the remote units 80-1, . . . , 80-8 are switched off, whilst the uplinks 60-1, . . . , 60-8 of the remote units 80-1, . . . , 80-8 remains active. This configuration corresponds to a low capacity scenario, e.g. during certain times of the day, at night or during the weekend, when less capacity is required for the signal traffic and so that the downlink activity of the remote units 80-1, . . . , 80-8 can be switched off. One further example of the low capacity configuration is known by providing all of the required capacity from an outdoor macro cell, whilst no capacity is provided by the distributed antenna system inside the building. In this further example, no downlink power is needed for the plurality of downlinks 50-1, 50-2, . . . , 50-8 of the remote units 80-1, . . . , 80-8.

In the configuration of FIG. 2, the upper remote units 80-1, 80-2, 80-3, 80-4 remains with a deactivated downlink 50-1, 50-2, . . . 50-4, whilst the lower remote units 80-5, 80-6, 80-7, 80-8 have an active downlink 50-5, 50-6, 50-7, 50-8. This configuration corresponds to a higher capacity scenario, where some of the remote units can remain switched off and some of the remote units should be active to address the capacity demand for the signal traffic. The higher capacity scenario of FIG. 2 may correspond to a user entering the ground floor of the building served by the communication system 10.

As can be seen on FIG. 1, a first detector 30 is located with the upper outer remote unit 80-4 and a second detector 32 is located with the lower outer remote unit 80-8. The first detector 30 and the second detector 30, 32 are provided for detecting an uplink activity of the corresponding co-located one of the upper remote unit 80-4 or the lower remote unit 80-8.

The first detectors 30 and the second detector, 32 are adapted to analyze by spectrum monitoring a received uplink signal 92. The received uplink signal 92 may be sent by the mobile station 90. One example of this received uplink signal 92 is the case in which a user with the mobile station 90 connected to a mobile radio cell, for example, in the outdoor macro cell comes within reach of the (indoor) distribution system 10, in particular within the coverage area of one or more of the remote units 80-1, . . . , 80-8. The outdoor macro call in this example is not connected to the distribution system 1.

A processor 40 is adapted to compare the amplitude of the received uplink signal 92 with a pre-defined threshold value. When the amplitude is higher than the threshold value, the processor 40 selects which ones of the downlinks 50-1, . . . , 50-8 of the remote units 80-1, . . . , 80-N 8 should be switched on. In addition to the total uplink power, the spectrum analysis can also provide an indication about the amount of spectrum usage to the processor 40 by analyzing the power per carrier for carriers carrying GSM telecommunications signals, or the amount of spectrum usage in terms of number of allocated resource blocks in the case of LTE telecommunications signals. The indication of the amount of spectrum usage can be used as an additional load indication. The processor 40 determines the load information based on the combined uplink power and the amount of uplink spectrum usage in order to compare this load information with the pre-defined threshold. Other triggering events for switching on downlink of the remote units 80-1, . . . , 80-8 could comprise information about the network performance or capacity demand provided from the base station 5 or the telecommunication network or by means to measure the network performance, such as load indications per cell.

The system 10 of the present disclosure enables the activation of downlinks on detection of a signal traffic or activity by the active uplinks of the remote units 80-1, . . . , 80-8. As will be explained with reference to FIG. 4, an uplink spectrum monitoring per remote unit 80-1, . . . , 80-8 or per group of remote units 80-1, . . . , 80-8 may be used as a cell activity indication, resulting in the switching on or the wake up of the downlink of the remote unit 80-1, . . . , 80-8 or of a group of remote units 80-1, . . . , 80-8.

FIG. 3 shows another example of a communications distribution system 210. The distribution systems 210 comprises a central hub 220 connected to a base station 205 and to a plurality of remote units 280-1, . . . , 280-8. The main difference between the distribution systems 210 and the distribution system 10 of FIGS. 2 and 3 is that the distribution system 210 comprises an activity detector 230 within the distribution system 210, to detect spectral activity of the remote units 280-1, . . . , 280-8 served by the distribution system 210.

Each of the respective remote units 280-1, . . . , 280-8, is provided with a downlink 250-1, 250-2, . . . 250-8 and an uplink 260-1, . . . , 260-8. The downlink 250-1, 250-2, . . . , 250-8 is adapted for the transmission of telecommunication signals from the central hub 220 to a mobile device station 90. The uplink 260-1, . . . , 260-8 is adapted for the transmission of telecommunication signals from the mobile device station 90 back to the central hub 220.

The distribution system 210 of FIG. 3 is shown in a higher capacity scenario, with a first group of four remote units 280-1, . . . , 280-4 (upper remote units in the figure) having downlinks which are switched off and a second group of remote units 280-5, . . . , 280-8 (lower remote units in the figure) having downlinks which are active.

Figure 4:
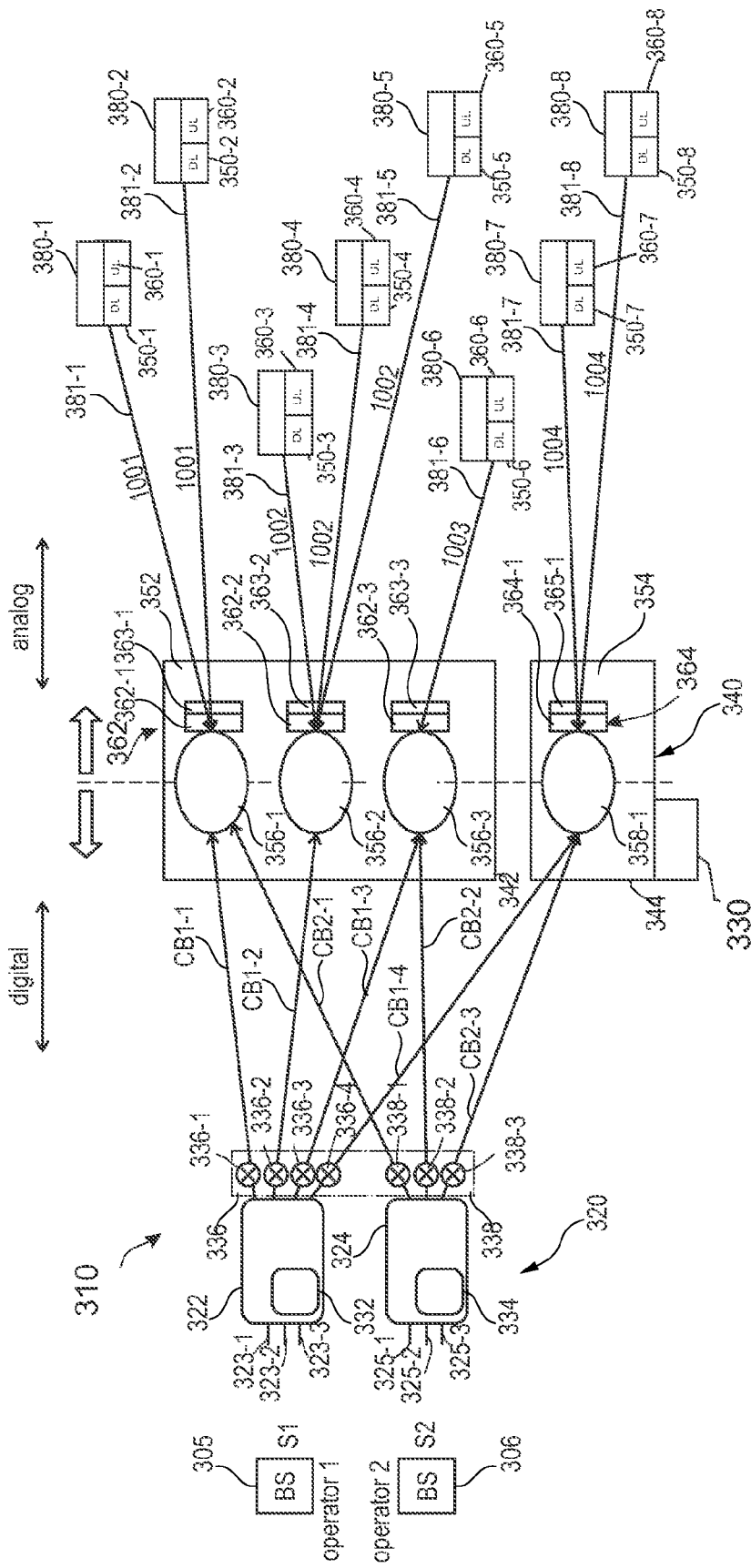
FIG. 4 shows an overview of a system according to another aspect of the present invention.

FIG. 4 shows another example of a communications distribution system 310. The distribution systems 310 comprises a central hub 320 connected to two base stations 305, 306 and to a plurality of remote units 380-1, . . . , 380-8. The main difference between the distribution system 310 of FIG. 4 and the distribution systems 10, 210 of FIGS. 1 and 3 is the routing capability as will be explained in the following.

The system 310 comprises an aggregation system or a central hub 320, connected to the base stations 305, 306 and a distribution system 340, which is in turn connected to the remote units 380-1, . . . , 380-M.

In the example of FIG. 4, there are eight remote units 80-1, . . . , 80-8, but this is a non-limiting example.

The central hub 320 comprises at least a first hub module 322 and a second hub module 324. The first hub module 322 has a first plurality of first ports 323-1, 323-2, 323-3 connected to a first base station 305, and the second hub module 324 has a second plurality of second ports 325-1, 325-2, 325-3 connected to at a second base station 306. The number of the first ports 323-1, 323-2, 323-3 and the second ports 325-1, 325-5, 325-3 is not limiting of the invention.

The first hub module 322 and the second hub module 324 are shown as two separate modules on FIG. 4 in an exemplary configuration. This configuration is not limiting of the invention and the central hub 320 may comprise a single module with the first plurality of first ports 323-1, 323-2, 323-3 connectable to the first base station 305 and the second plurality of second ports 325-1, 325-2, 325-3 connectable to the second base station 306. Alternatively, signals from the first base station 305 and the second base stations 306 may be combined, in the analog domain, and passed to a single port of the central hub 320.

The first base station 305 and the second base station 306 are adapted for processing telecommunication signals to and from one or more network operators.

The plurality of the first ports 323-1, 323-2, 323-3 and the second ports 325-1, 335-5, 325-3 support either a digital connection with the baseband or the radio access network, or a radio frequency (RF) connection.

The first hub module 322 and the second hub module 324 comprise respectively a first front end module 332 and a second front end module 334. The first hub module 322 processes incoming or outgoing first signals S1 at the first input ports 323-1, 323-2, 323-3 and the second hub module process incoming or outgoing second signals S2 from the second input ports 325-1, 325-2, 325-3.

The first front end module 332 and second front end module 334 include a digital to analog converter, if the first input signals S1 and the second input signals S2 are in the analog domain. The first front end module 332 and second front end module 334 generate respectively from the first input signals S1 and the second input signals S2 in the analog domain a first plurality of first carrier bundles CB1-1, . . . , CB-N1 from the first input signals S1 and second plurality of second carrier bundles CB2-1, . . . CB2-N2 from the second input signals S2 in the digital domain. Alternatively, the different carrier bundles can also be set up out of both signals S1 and S2.

The first input signals S1 and the second input signals S2 may comprise a plurality of carriers, depending on the network operators. The first input signals S1 may be, for example, signals in a first frequency band, whilst the second input signals S2 may be assigned a second frequency band. The first input signals S1 and the second input signals S2 may use different protocols, including but not limited to GSM, UMTS, LTE, IEEE 802.1, if applicable with MIMO functionality and/or separate MIMO protocols.

The first carrier bundle CB1-1, . . . , CB-N1 and the second carrier bundle may comprise a plurality of first input signals S1 of different frequencies and/or protocols and the second carrier bundle CB2-1, . . . CB2-N2 may comprise second input signals S2 of other different frequencies and/or protocols. All of the first input signals S1 and the second input signals S2 in the respective first carrier bundle CB1-1, . . . , CB-N1 or the second carrier bundle CB2-1, . . . CB2-N2 are jointly processed. The skilled person will understand that the carrier bundles CB1-1, . . . , CB-N1 and CB2-1, . . . CB2-N2 may comprise only a first input signal S1 and a second input signal S2 of only one carrier and frequency.

In the example shown in FIG. 4, there are four first carrier bundles (N1=1 to 4) and three second carrier bundles (N2=1 to 3). This is a non-limiting example. The first front end module 332 and second front end module 334 may be configured to generate up to six carrier bundles (CB1, . . . CB-6) out of the signals at the three ports. However, this is not a limiting example.

The number N1 and composition of first carrier bundles CB1-1, . . . , CB-N1 and the number N2 and composition of second plurality of second carrier bundles CB2-1, . . . CB2-N2 may be modified, as will be explained later with reference to FIG. 5.

The first hub module 322 and the second hub module 324 comprise respectively a first gain module 336, with a plurality of first variable gain units 336-1, . . . , 336-N1, and a second gain modules 338, with a plurality of second variable gain units 338-1, 338-N2.

A separate one of the first variable gain units 336-1, . . . , 336-N1 is provided for each of the first carrier bundles CB1-1, . . . , CB1-N1 and a separate one of the second variable gain units 338-1, . . . , 338-N1 is provided for each of the second carrier bundles CB2-1, . . . , CB2-N2. The first gain units 336-1, . . . , 336-N1 are adapted to adjust the first input signal S1 in one of the first carrier bundles CB1-1, . . . , CB1-N1, and the second variable gain units 338-1, . . . , 338-N1 are adapted to adjust the second input signal S2 in one of the second carrier bundles CB2-1, . . . , CB2-N2. The first gain modules 336 and the second gain modules 338 therefore enable an independent individual gain adjustment of the first input signal S1 and the second input signal S2 in each of the first carrier bundles CB1-1, . . . , CB1-N1 and the second carrier bundles CB2-1, . . . , CB2-N2.

The first gain modules 336 and the second gain modules 338 are digitally connected to the distribution system 340.

The connection between the central hub 320 and the distribution system 340 is in the digital domain. This allows different kinds of routing capability, carrier bundles and individual gain adjustment in a highly flexible manner.

The distribution system 340 comprises at least one expansion unit 342, 344 connected to the plurality of remote units 380-1, . . . 380-M. The first expansion unit 342 has a first switch unit 352 followed by a first digital-to-analog converter (DAC) 362. The second expansion unit 344 has a second switch unit 354 followed by a second digital-to-analog converter 364.

The first switch unit 352 and the second switch unit 354 are each adapted to define a predefined number M of first coverage areas modules 356-1, . . . , 356-M and second coverage area modules 358-1, . . . , 358-M. Each one of the coverage area modules 356-1, . . . , 356-M, 358-1, . . . , 358-M is associated to a coverage area.

The coverage area is defined as an area in which an identical signal is relayed by one or more remote units 380-1 to 380-N. The coverage area may correspond to a single defined cell of one of the communication systems served by the central hub 320. Different coverage areas may represent different cells or a single cell may expanded to cover multiple coverage areas. Similarly different coverage areas may be expanded over a single cell. The coverage area module 356-1, . . . , 356-M, 358-1, . . . , 358-M outputs an RF signal to be relayed to a reconfigurable number of remote units 380-1 to 380-N. In other words, the remote unit 380-1 to 380-N assigned to the coverage area will be connected to the corresponding one of the first coverage area module 356-1, . . . , 356-M or the second coverage area module 358-1, . . . , 358-M and will therefore receive the same coverage area module rf signal $S_{CA}$.

The first switch unit 352 in FIG. 4 has three exemplary coverage areas modules 356-1, . . . , 356-3. The first coverage area module 356-1 is adapted to relay a first coverage signal 1001, the second coverage area module 356-2 is adapted to relay a second coverage signal 1002, and the third coverage area module 356-3 is adapted to relay a third coverage signal 1003.

The second switch unit 354 has as an example a fourth coverage area module 358-1, which is adapted to relay a fourth coverage signal 1004.

In the example of FIG. 4, the first coverage signal 1001 is relayed to the first remote unit 380-1 and the second remote unit 380-2, via a first remote unit connection 81-1 and a second remote unit connection 381-2. The second coverage signal 1002 is relayed to the third remote unit 380-3, the fourth remote unit 380-4 and the fifth remote unit 380-5, via the third remote unit connection 381-3, the fourth remote unit connection 381-4 and the fifth remote unit connection 381-5. The third coverage signal 1003 is relayed to the sixth remote unit 80-6 via a sixth remote unit connection 381-6. The fourth coverage signal 1004 is relayed to the seventh remote unit 380-7 via a seventh remote unit connection 381-7 and to the eighth remote unit 380-8, via an eighth remote unit connections 381-8.

The first switch unit 352 and the second switch unit 354 serve the different first coverage area modules 356 and second coverage area modules 358 and are reconfigurable. The reconfiguration allows the different connections corresponding to the (re)assignments of the remote units 380-1 to 380-N and the carrier bundles CB to be made to the different ones of the coverage areas. The reconfiguration may be done depending on the capacity needs, as will be explained later with reference to FIG. 5. The first coverage area modules 356-1, . . . , 356-M1 and the second coverage area modules 358-1, . . . , 358-M2 are connectable to each of the remote units 380-1, . . . , 380-N. On the other hand, one of the remote units 380-1 to 380-N is connectable to only a single one of the first coverage area modules 56-1, 56-M1 or the second coverage area modules 358-1, . . . , 358-M2 at a time. For example, all of the remote units 380-1, . . . , 380-N may be assigned to a single one of the coverage areas, or none of the remote units 380-1, . . . , 380-N are connected to one of the first coverage area modules 356-1, . . . , 356-M1 or the second coverage area modules 358-1, . . . , 358-M2.

The remote unit connections 381-1, . . . , 381-8 between the first coverage area modules 356-1, . . . , 356-M1 and the second coverage area modules 358-1, . . . , 358-M2 of the expansion units 352 and 354 and the remote units 380-1, . . . , 380-N are in the analog domain. The first coverage area modules 56-1, . . . , 56-M1 and the second coverage area modules 358-1, . . . , 358-M2 comprise a plurality of first digital-analog-converters 362-1, . . . , 362-M1 and second digital to analog converters 364-1, . . . , 364-M2 followed by a first transceiver 363-1, 363-2, . . . , 363-M1 or second transceiver 365-1, . . . , 365-M2 for relaying the carrier bundles CB to the corresponding ones of the remote units 380-1, . . . , 380-N. In the example of FIG. 4, the number M1 is equal to 3 and the number M2 is equal to 1.

The number of the first digital-to-analog converters 362-1, . . . , 362-M1 and the second digital to analog converters 364-1, . . . , 364-M2 and the number of the first transceivers 363-1, . . . , 363-M1 and the second transceivers 365-1, . . . , 365-M2 may be reduced in comparison to a full digital routing capability, since the total number of the first coverage areas modules 356-1, . . . , 356-M1 and the second coverage area modules 358-1, . . . , 358-M2 is less than the total number of remote units 380-1, . . . , 380-N.

A processor is adapted to define, at a given time, which ones of the remote units 380-1, . . . , 380-N should be assigned to which coverage area, i.e. which of the remote units 380-1, . . . , 380-N should receive the same RF telecommunications signal. Alternatively, the processor could be adapted to reassign the remote units 380-1, . . . , 380-N to different ones of the coverage areas based on externally triggering events. Such external triggering events include, but are not limited to, such detecting RF signal activity in an uplink or information about the network performance or capacity demand provided either from one of the base stations 305 or 306 or the communication network, or by means to measure the network performance, such as load indications per cell.

Hence, each base station 305, 306 or baseband unit provides a plurality of carriers or a plurality of groups of multiple carriers providing telecommunications signals and these telecommunication signals are jointly processed.

The carrier bundles CB are passed to one of the first coverage area modules 356-1, . . . , 356-M1 or the second coverage area modules 358-1, . . . , 358-M2. Each of the plurality of remote units 380-1, . . . , 380-N is assigned to a single one of the coverage area modules 356-1, . . . , 356-M1, 358-1, . . . , 358-M2. The carrier bundles are reconfigurable and may be redefined depending on the required coverage. For example, the a carrier bundle can be passed simultaneously to more than one of the first coverage area modules 356-1, . . . , 356-M and of the second coverage area modules 358-1, . . . , 358-M2. Similarly, two of the carrier bundles with the same signals or carriers may be passed to the same one of the first coverage area modules 356-1, . . . , 356-M1 or the second coverage area modules 358-1, . . . , 358-M2 module, with a same weight or with different weights applied by the corresponding one of the first variable gain units 36-1, . . . , 336-N1 or the second variable gain unit 338-1, . . . , 338-N1.

Each of the corresponding remote units 380-1, . . . , 380-8, is provided with a downlink 350-1, 350-2, . . . 350-8 and an uplink 360-1, . . . , 360-8. The downlink 350-1, 350-2, . . . , 350-8 is adapted for the transmission of telecommunication signals from the central hub 320 to a mobile device station 90. The uplink 360-1, . . . , 360-8 is adapted for the transmission of telecommunication signals from the mobile device station 90 back to the central hub 320.

In the configuration of FIG. 4, all of the downlinks 350-1, 350-2, . . . , 350-8 and of the uplinks 360-1, . . . , 360-8 of the remote units 380-1, . . . , 380-8 are active. This configuration corresponds to a high capacity scenario. However, during certain times of the day, at night or during the weekend, when less capacity is required for the signal traffic, at least one of the downlinks 350-1, 350-2, . . . , 350-8 of the remote units 380-1, . . . , 380-8 can be switched off. Some of the remote units can remain switched off and some of the remote units should be active to address the capacity demand for the signal traffic.

As can be seen on FIG. 4, an activity detector 330 is provided within the distribution system 310. The activity detector 330 is configured to detect an uplink activity of the remote units 380-1, . . . , 380-8 served by the distribution system 310. The downlinks 350-1, 350-2, . . . , 350-8 may be switched on or off depending on the detected uplink activity, as explained with reference to FIG. 6.

FIG. 5 shows a workflow of a method of routing incoming signals according to an aspect of the present disclosure. The method is described with reference to the system of FIG. 4.

In a first step S200, the first input signal S1 and the second input signal S2 are passed from the first base station 305 and/or the second base station 306 to the central hub 320.

The first front end module 332 and second front end module 334 are adapted to collect the first input signal S1 and the second input signal S2 and digitize the first input signals S1 and the second input signals S2 (when needed) in step S210 and generate four of the first carrier bundles CB1-1, CB1-2, CB1-3, CB1-4 from the first input signal S1 and three second carrier bundles CB2-1, CB2-2, CB2-3 from the second input signals S2 in step S220. Alternatively the different carrier bundles can also be set up out of both signals S1 and S2.

The first input signal S1 and the second input signal S2 may comprise a plurality of carriers, depending on the network operators.

A carrier bundle CB comprise a plurality of carriers or a plurality of groups of multiple carriers jointly processed, as noted above. The carrier bundle may comprise only one single carrier.

In the non-limiting example of FIG. 4, there are four first carrier bundles (N1=4) and three second carrier bundles (N2=3). The first front end module 332 and second front end module 334 may be configured to generate each up to six carrier bundles out of the incoming signals from the three input ports.

In a step S230, each of the remote units 380-1, . . . , 380-8 (N=8 in this non-limiting example) is assigned to a single one of the coverage area, and hence to one first coverage area module 356-1, ..., 356-M1 or to one second coverage area module 358-1, ..., 358-M2. The carrier bundles CB1-1, CB1-2, CB1-3, CB1-4, CB2-1, CB2-2, CB2-3 are also assigned to a coverage area and thus to an associated one of the first coverage area modules 356-1, ..., 356-M1, and the second coverage modules 358-1, ..., 358-M2.

In the example of FIG. 4, a first one CB1-1 of the first carrier bundles CB1-1 to CB1-4 and a first one CB2-1 of the second carrier bundles CB2-1 to CB2-3 are assigned to the first coverage area module 356-1. A second one CB1-2 of the first carrier bundles CB1-1 to CB1-4 is assigned to the second coverage module 356-2. A third one CB1-3 of the first carrier bundles CB1-1 to CB1-4 and a second one CB2-2 of the second carrier bundles CB2-1 to CB2-3 are assigned to the third coverage area module 356-3. A fourth one CB1-4 of the first carrier bundles CB1-1 to CB1-4 and a third one CB2-3 of the second carrier bundles CB2-1 to CB2-3 are assigned to the fourth coverage area module 356-3.

The assignment and parameterization of each of the carrier bundles CB1-1, CB1-2, CB1-3, CB1-4, CB2-1, CB2-2, CB2-3 can be done independently for each carrier bundle CB1-1, CB1-2, CB1-3, CB1-4, CB2-1, CB2-2, CB2-3 and therefore for each network operator/provider signal.

In the example of FIG. 4, each of the carrier bundles CB1-1, CB1-2, CB1-3, CB1-4, CB2-1, CB2-2, CB2-3 is assigned to a one of the first coverage area modules 356-1, ..., 356-M or the second coverage area modules 358-1, ..., 358-M2.module. This assignation is not limiting the invention and a carrier bundle CB1-1, CB1-2, CB1-3, CB1-4, CB2-1, CB2-2, CB2-3 can be passed simultaneously to more than one of the first coverage area modules 356-1, ..., 356-M and of the second coverage area modules 358-1, ..., 358-M2. Similarly, two or more carrier bundles of the first carrier bundles CB1-1, CB1-2, CB1-3 or of the second carrier bundles CB2-1, CB2-2, CB2-3 can carry the same signal and be passed to the same or to different coverage area modules, yet with different weight by the variable gain units 336-1, 336-2, 336-3 or 338-1, 338-2, 338-3.

It will be understood that a carrier bundle may comprise a single carrier, a plurality of carriers or a plurality of groups of multiple carriers jointly processed.

Each of the remote units 380-1, ..., 380-8 is assigned to a single coverage area and hence to a single one of the first coverage area modules 356-1, 356-2, 356-3 or to the second coverage module 358-1. In the example of FIG. 1, the first remote unit 380-1 and the second remote units 380-2 are assigned to the first coverage area module 356-1. The third remote unit 380-3, the fourth remote unit 380-4 and the fifth remote unit 380-5 are assigned to the second coverage area 356-2, the sixth remote unit 380-6 is assigned to the third coverage area 356-3, and the seventh remote unit 380-7 and the eighth remote units 80-8 are assigned to the fourth coverage area 358-1.

In step S240, the carrier bundles CB1-1, CB1-2, CB1-3, CB1-4, CB2-1, CB2-2, CB2-3 are weighted by the corresponding first variable gain units 336-1, ..., 336-4 and the second variable gain unit 338-1, and passed to the corresponding ones of the first coverage area modules 356-1, 356-2, 356-3, or the second coverage area module 358-1 in the first expansion hub 352 or the second expansion hub 354 of the distribution system 340.

As noted above, the first gain units 336-1, ..., 336-4 and the second gain unit 338-1 provides for an independent individual gain adjustment of the carrier bundles CB1-1, CB1-2, CB1-3, CB1-4, CB2-1, CB2-2, CB2-3. The relative gain may be adjusted per carrier bundle CB1-1, CB1-2, CB1-3, CB1-4, CB2-1, CB2-2, CB2-3. The different carrier bundles CB1-1, CB1-2, CB1-3, CB1-4, CB2-1, CB2-2, CB2-3 can have different relative gains to ensure for example that the power share provided to each one of the network operators is the same, independent of the number of carriers used by each network operator. The relative gain could be also used to individually optimize the transmit power at the remote units 380-1, ..., 380-N for each network operator.

The first gain units 336-1, ..., 336-4 and the second gain unit 338-1 operate in the digital domain within the distribution system 340.

In step S250, the signals in the carrier bundles CB1-1, CB1-2, CB1-3, CB1-4, CB2-1, CB2-2, CB2-3 are converted by the digital-to-analog converters 362-1, 362-2, 362-3, 364-1 from the digital domain to the analog domain and relayed in step 260 to the remote units 380-1, ..., 380-N assigned to the respective first coverage area modules 356-1, ..., 356-M1 or the second coverage area modules 358-1, ..., 358-M2. In the example of FIG. 1, the first ones CB1-1 and CB2-1 of the first carrier bundle and the second carrier bundle are therefore relayed to the first remote unit 380-1 and the second remote unit 380-2. The second one CB1-2 of the first carrier bundle is relayed to all of the third remote unit 380-3, the fourth remote unit 380-4 and the fifth remote unit 380-3. The third one CB1-3 of the first carrier bundle and the second one CB2-2 of the second carrier bundle are relayed to the sixth remote unit 380-6. The fourth one CB1-4 of the first carrier bundle and the third one CB2-3 of the second carrier bundle are relayed to the seventh remote unit 380-1 and eighth remote unit 380-8.

The remote units 380-1, ..., 380-8 are provided with a relative power setting per band.

By providing for a flexible and reconfigurable assignment of the carrier bundles CB1-1, CB1-2, CB1-3, CB1-4, CB2-1, CB2-2, CB2-3 from one or more of the base stations 305, 306 to different coverage areas, and hence different ones of the first coverage area modules 356-1, ..., 356-M1 or the second coverage area modules 358-1, ..., 358-M2 in the distribution system 340, the different carriers from the same base station 305, 306 can be routed to different remote units 380-1, ..., 380-N. Similarly, different network operator signals from different base stations 305, 306 or individual carriers of the different network operator signals can be assigned to different carrier bundles CB1-1, CB1-2, CB1-3, CB1-4, CB2-1, CB2-2, CB2-3 and, therefore, routed differently.

Furthermore, the carrier bundle CB1-1 and CB1-3 of the base station 305—e.g. representing different cells of the base stations 305, 306 but addressing the same carrier frequencies—can be routed to the same coverage area with varying gain over time to support seamless handover when changing an assignment of the carrier bundle to a coverage module.

A method for managing power consumption of a distribution system according to the present disclosure is described with reference to FIG. 6 and the distribution system 10 of FIGS. 1 and 2.

At the start of the method, the distribution system 10, 210 has been switched into a low capacity configuration, i.e. in the configuration of FIG. 1 where all the downlinks 50-1, ..., 50-8 have been switched of and the uplinks 60-1, ..., 60-8 remains active. The uplink connection is kept switched on to ensure that a connection can be made to any mobile station 90 entering a cell or a plurality of cells covered by the remote units 80-1, ..., 80-8. One of the first detector 30 or the second detector 32 may be used to determine or detect any uplink activity which can be used to trigger the switching on of the downlink path.

In a first step S100, an uplink activity is detected by the first detector 32 located in the lower remote unit 80-8. As noted above, this uplink activity can occur when a user and its mobile station 90 enters one of the uplink detection ranges of the remote units 80-8 of the distribution wireless distribution system 10. The uplink signal of the mobile station 90 reaches one of the remote units 80-1, . . . , 80-8 with switched off downlink, the mobile station 90 is still connected to a macro cell outside of the distribution system 10.

In a second step S200, the received uplink signal is analyzed by spectrum monitoring and compared by the processor 40 to the pre-defined threshold value. Activity threshold can be defined to set the required threshold value for the activity level to initiate the switching. It will be appreciated that the activity threshold value can be chosen or adjusted to avoid unintended switching on of the downlink connection in case of weak uplink signals or for using the wireless distribution system 10 for offloading signal traffic from the macro cell once a certain activity level of traffic signals is exceeded in the coverage area of the distribution system 10.

In a third step S300, the processor 40 decides that the corresponding downlinks 50-4, . . . , 50-8 of the group of lower remote units 80-5 to 80-8 should be switched on, when the received uplink signal power is higher than said the pre-defined threshold value. In other words, the corresponding downlink of four remote units of the group of lower remote units 80-5 to 80-8 is switched on based on the activity detection in the uplink path connection of said the remote unit.

With reference to FIGS. 1 and 2, only the four lower remote units 80-5 to 80-8 switch on the downlink connection. These four lower remote units 80-5 to 80-8 may correspond to the remote units located on a same floor of a building. It will be appreciated that the remote units switching on the downlink path are those ones of the remote units which are able to detect activity in the uplink, or those ones of the remote units who belong to a pre-defined group of remote units which should switching on their downlink once at least one of the members of this group of remote units of this group detects an uplink activity.

The downlink can be switched off again, if no uplink activity is detected any more at the remote units. A waiting time period is preferably defined before switching off the downlink to avoid sudden or unexpected drop of communication between any one of the remote units and the mobile station 90. Furthermore, a hysteresis to avoid a switch on/off ping pong effect can be considered.

The examples of illustrated in the figures are not intended to limit the invention but are only given to show how the individual power settings per remote unit based on uplink activity detection by scanning the uplink power and/or analyzing the uplink spectrum per remote unit or groups of remote units. This in turn results in power savings.

While various embodiments of the present invention have been described above, it should be understood that they have been presented by way of example, and not limitation. It will be apparent to persons skilled in the relevant arts that various changes in form and detail can be made therein without departing from the scope of the invention.

The invention claimed is:

1. A system for relaying telecommunication signals, the system comprising:
    a central hub connectable to one or more base stations;
    a plurality of remote units for relaying a telecommunication signals supplied by the central hub, whereby the remote units are provided with a plurality of uplinks and a plurality of downlinks; and
    a detector for detecting an activity on the uplink; whereby the system is adapted to independently switch at least one of the plurality of downlinks, whilst the plurality of uplinks remains active,
    wherein the central hub comprises a first hub module connectable to a first base station and a second hub module connectable to a second base station, wherein the first hub module comprises a first front end module with a first pain module adapted to process first incoming signals and the second hub module comprises a second front end module with a second gain module adapted to process second incoming signals, wherein the first hub module and the second hub module are adapted to generate a plurality of carrier bundles from the first and second incoming signals; and
    wherein the system comprises a distribution system digitally connected to the central hub adapted to route the plurality of carrier bundles to at least one remote unit of the plurality of remote units, the connection between the distribution system and the plurality of remote units being reconfigurable,
    wherein the distribution system comprises a plurality of expansion units analogically connected to the plurality of remote units, each expansion unit comprising a switch unit digitally connected to one of the first gain module and the second gain module followed by a digital-to-analog converter.

2. The system of claim 1, wherein the detector is adapted to detect at least one of a signal amplitude at a defined frequency range or an uplink power spectrum density and to make a comparison with a predefined threshold value.

3. The system of claim 2, wherein the system is adapted to switch on one or more of the downlinks based on said comparison.

4. The system of claim 1, wherein the detector is located within the central hub.

5. The system of claim 1, wherein the detector is located within one or more remote units of the plurality of remote units.

6. The system of claim 1, wherein at least one of the plurality of expansion units is provided with a plurality of coverage area modules, wherein one or more of the plurality of remote units is connected to a selected one of the plurality of coverage area modules, the selected one of the coverage area modules being adapted to relay the same signals to the connected one or more of the plurality of remote units.

7. The system of claim 6, wherein at least one of the remote units may be connected from a first selected one of the coverage area modules to a second selected one of the coverage area modules.

8. The system according to claim 6, wherein a number of coverage area modules is less than a number of remote units.

9. The system of claim 6, wherein the central hub is to pass the at least one carrier bundle to at least one of the coverage areas modules.

10. A method for managing power consumption of a system comprising a central hub connected to a plurality of remote units by a connection, wherein the remote units are provided with an uplink and a downlink, and wherein the central hub comprises a first hub module connectable to a first base station and a second hub module connectable to a second base station, wherein the central hub is digitally connected to a central distribution system comprising a plurality of expansion units analogically connected to the plurality of remote units, the method comprising:

switching off the downlinks;

detecting an uplink activity signal corresponding to an uplink activity in at least one of the remote units;

switching on one or more of the downlinks on detection of the uplink activity signal, generating a plurality of carrier bundles from first incoming signals and second incoming signals, wherein the method comprises processing the first incoming signals by a first front end module with a first gain module of the first hub module and processing the second incoming signals by a second front end-module with a second gain module of the second hub module; and routing, By the distribution system, the generated plurality of carrier bundles to at least one remote unit of the plurality of remote units, reconfiguring the connection between the distribution system and the plurality of remote units, the reconfiguring comprising switching, by a switch unit of each expansion unit between the first gain module and the second gain module, the switch being digitally connected to one of the first gain module and the second gain module followed by a digital-to-analog converter.

11. The method of claim 10, comprising analyzing by spectrum monitoring the uplink signal and comparing an uplink signal power to a predefined activation threshold value.

12. The method of claim 10, comprising analyzing by spectrum monitoring the uplink spectrum usage by determining the uplink power spectrum density as load indication and comparing the load indication to a predefined load threshold value.

13. The method of claim 10, wherein the step of detecting comprises the steps of detecting at least one of a signal amplitude at a defined frequency range or an uplink power spectrum density and comparing the signal amplitude with a predefined threshold value; wherein the method comprises the step of switching one or more downlinks based on the step of comparing.

* * * * *

UNITED STATES PATENT AND TRADEMARK OFFICE
CERTIFICATE OF CORRECTION

PATENT NO. : 9,603,096 B2
APPLICATION NO. : 14/823049
DATED : March 21, 2017
INVENTOR(S) : Martin Weckerle et al.

Page 1 of 1

It is certified that error appears in the above-identified patent and that said Letters Patent is hereby corrected as shown below:

In the Claims

Claim 1, Line 17, reads:
"module with a first pain module"

Should read:
-- module with a first gain module --.

Signed and Sealed this
Sixth Day of June, 2017

Michelle K. Lee
*Director of the United States Patent and Trademark Office*